(12) United States Patent
Ceste et al.

(10) Patent No.: US 12,539,957 B2
(45) Date of Patent: Feb. 3, 2026

(54) EMERGENCY BACKUP POWER SOURCE AND CONTROL CIRCUIT FOR ELECTRICALLY OPERATED AIRCRAFT WINDOW SHADES

(71) Applicant: AEROSPACE TECHNOLOGIES GROUP, INC., Boca Raton, FL (US)

(72) Inventors: Mario Ceste, Boca Raton, FL (US); Mohamed Mohamed, Boca Raton, FL (US)

(73) Assignee: AEROSPACE TECHNOLOGIES GROUP, INC., Boca Raton, FL (US)

( * ) Notice: Subject to any disclaimer, the term of this patent is extended or adjusted under 35 U.S.C. 154(b) by 0 days.

(21) Appl. No.: 18/400,035

(22) Filed: Dec. 29, 2023

(65) Prior Publication Data
US 2024/0217646 A1    Jul. 4, 2024

Related U.S. Application Data (60) Provisional application No. 63/436,002, filed on Dec. 29, 2022.

(51) Int. Cl.
*H02J 7/00*       (2006.01)
*B64C 1/14*       (2006.01)

(52) U.S. Cl.
CPC ...... *B64C 1/1484* (2013.01); *H02J 7/007182* (2020.01)

(58) Field of Classification Search
CPC ............................... H02J 7/007182
USPC .......................................... 307/66
See application file for complete search history.

(56) References Cited

U.S. PATENT DOCUMENTS

| | | | |
|---|---|---|---|
| 5,914,542 A * | 6/1999 | Weimer ................. | H02J 7/345 307/64 |
| 7,690,414 B2 | 4/2010 | Knowles | |
| 9,142,191 B2 * | 9/2015 | Jang ....................... | H02H 1/04 |
| 10,174,527 B2 | 1/2019 | Dente | |

(Continued)

FOREIGN PATENT DOCUMENTS

JP        2000034860 A  *  2/2000

OTHER PUBLICATIONS

JP Document (Year: 2000).*

(Continued)

*Primary Examiner* — Daniel Kessie
*Assistant Examiner* — Dru M Parries
(74) *Attorney, Agent, or Firm* — The Concept Law Group, PA; Scott D. Smiley; Scott M. Garrett (57) ABSTRACT

An emergency backup power source for an electrically controlled and motorized window shade unit includes an input power switch, and charge and discharge control circuit, and a supercapacitor bank. During normal operation a nominal voltage level from a main power source of the aircraft is provided directly to the window shade unit through the input power switch, and the supercapacitor bank is charged. The input voltage is monitored by the emergency backup power source, which controls the input power switch. When the input voltage drops below a threshold level, the input power switch is opened and the charge and discharge circuit operates to provide an emergency output voltage to the window shade unit from the supercapacitor bank so that the window shade can be fully opened or closed, as is required.

17 Claims, 5 Drawing Sheets

(56) References Cited

U.S. PATENT DOCUMENTS

| | | | | |
|---|---|---|---|---|
| 2010/0231049 | A1* | 9/2010 | Hinton | H02J 9/061 |
| | | | | 307/66 |
| 2014/0048219 | A1 | 2/2014 | Knowles | |
| 2016/0107635 | A1* | 4/2016 | Kodawara | B60L 7/14 |
| | | | | 180/65.265 |
| 2016/0380478 | A1* | 12/2016 | Wells | H02M 7/70 |
| | | | | 307/68 |
| 2017/0267105 | A1 | 9/2017 | Fratelli et al. | |
| 2020/0008288 | A1* | 1/2020 | Park | A61B 6/4405 |

OTHER PUBLICATIONS

Analog Devices, Inc., LTC3350 "High Current Supercapacitor Backup Controller and System Monitor", www.analog.com, Sep. 2021, pp. 1-46.

Extended European Search Report for EPO Application No. 23220749.8 dated Jun. 28, 2024.

* cited by examiner

EMERGENCY BACKUP POWER SOURCE AND CONTROL CIRCUIT FOR ELECTRICALLY OPERATED AIRCRAFT WINDOW SHADES

CROSS REFERENCE

This application claims the benefit of U.S. provisional application No. 63/436,002 filed Dec. 29, 2022, the entirety of which is hereby incorporated by reference.

FIELD OF THE INVENTION

The present invention relates generally to electrically operated aircraft window shades, and, more particularly, relates to an emergency backup power source and circuit for operating electrically operated aircraft window shades in the event of a power loss.

BACKGROUND OF THE INVENTION

Traditional window shades on commercial aircraft have historically been constructed as a flat plastic blade which slides up and down over the window opening. The shade is manually operated by the passenger grabbing a handle on the plastic blade and raising or lowering it to block the desired amount of light or to allow visibility outside the aircraft. There are times, however, when all of the window shades are desired to be opened or closed. With manually operated window shades, the flight crew must inspect the cabin and request passengers move the window shade to the desired position.

Electric window shades have been become a passenger convenience on commercial airliners, replacing the manually operated shade. A control interface with buttons allow passengers to press a button to automatically raise or lower the window covering. These systems also give the flight crew control over the window shades so that they can simultaneously control the positions of all window shades in the aircraft from the flight attendant panel, raising the window shades to the fully open position during takeoff and landings, or lowering the window shades to darken the cabin during the flight.

Despite the benefits of electric window shades, there is one drawback. In the event of a loss of main aircraft power, the electric window shades are not operable because they depend on aircraft power to operate. This deficiency has been addressed by adding a mechanical override system to the electric window shade that allows manual operation of the window shade. An example a mechanical override for an electrically operated aircraft window shade is described in U.S. Pat. No. 7,690,414 which describes the use of a special tool to manually crank the window shade open when there is a loss of power.

To avoid having to manually crank the electric window shades, alternative systems have connected the shades to the aircraft emergency power system which powers emergency lighting and other systems. This allows the electric window shades to remain power even when the normal aircraft power is lost. However, the drawback of this solution is the added power demand placed on the aircraft emergency power system. The additional power demand results in emergency power systems being enlarged adding weight from the additional batteries required.

Therefore, a need exists to overcome the problems with the prior art as discussed above.

SUMMARY

In accordance with some embodiments of the inventive disclosure, there is provided an emergency power backup system for an electrically controlled aircraft device. The system includes a supercapacitor bank and a charge and discharge circuit coupled between the supercapacitor bank and a voltage feed line (an output) to the electrically controlled aircraft device. There is also a switch coupled in series between a main power source (input) and the voltage feed line (output). There is further included a control circuit that is configured to sense a voltage level from the main power source. When the voltage level from the main power source is above a preselected threshold voltage, the system will maintain the switch in a closed state to allow current from the main power source to flow to the electrically controlled aircraft device and to further charge the supercapacitor bank to a preselected voltage level. When the voltage level from the main power source falls below the preselected threshold voltage, the system will open the switch and operate the charge and discharge circuit to generate a voltage to the electrically controlled aircraft device.

In accordance with a further feature, the electrically controlled aircraft device is an electrically controlled aircraft window shade unit.

In accordance with a further feature, the system further includes a temperature sensing element that provides a signal to the control circuit indicating a temperature of the supercapacitor bank, and the control circuit is configured to adjust a charge current to the supercapacitor bank based on the temperature of the supercapacitor bank as indicated by the signal.

In accordance with a further feature, the control circuit operates the charge and discharge circuit to charge the supercapacitor bank to a maximum voltage that is about twenty percent of a nominal voltage provided by the main power source to the electrically controlled aircraft device.

In accordance with a further feature, the control circuit includes an external input to cause the control circuit to open the switch and operate the charge and discharge circuit to generate the voltage to the electrically controlled aircraft device from the supercapacitor bank.

In accordance with a further feature, a charge current regulated by the charge and discharge circuit is selectable.

In accordance with a further feature, the supercapacitor bank comprises a plurality of supercapacitors, the control circuit is configured to monitor a voltage of each one of the plurality of supercapacitors.

In accordance with a further feature, the plurality of supercapacitors are arranged in series.

In accordance with a further feature, the voltage generated by the charge and discharge circuit is above the preselected threshold voltage.

In accordance with some embodiments of the inventive disclosure, there is provided a method for providing a backup power source to an aircraft device that includes providing, between a main power source and the aircraft device, an input power switch having an input side and an output side. The method further includes sensing an input voltage level on an input side of the input power switch, and sensing an output voltage level at an output side of the input power switch. The method also includes, when the input voltage level as sensed at the input side of the input power switch is above a preselected threshold voltage level, maintaining the input power switch in a closed state and operating a charge and discharge circuit to charge a supercapacitor bank that is operably connected to the output side of the input power switch, and maintain a supercapacitor voltage level at a supercapacitor nominal voltage level. The method also includes, when the input voltage level as sensed at the input side of the input power switch falls below the preselected threshold voltage level, opening the input power switch and maintaining the input power switch in an open state while a voltage at the input side of the input power switch is below the preselected threshold voltage level, and operating the charge and discharge circuit to provide an emergency voltage level at the output side of the input power switch from the supercapacitor bank.

In accordance with a further feature, the aircraft device is a motorized window shade unit, the method further comprises, when the input voltage level as sensed at the input side of the input power switch falls below the preselected threshold voltage level, operating a motor of the motorized window shade unit using the emergency voltage level to open or close a window shade of the motorized window shade unit.

In accordance with a further feature, the method further includes providing a temperature sensing element that provides a signal to a control circuit indicating a temperature of the supercapacitor bank, and adjusting a charge current to the supercapacitor bank based on the temperature of the supercapacitor bank as indicated by the signal.

In accordance with a further feature, the control circuit operates the charge and discharge circuit to charge the supercapacitor bank to a maximum voltage that is about twenty percent of a nominal voltage provided by the main power source to the aircraft device.

In accordance with a further feature, the method further includes providing the control circuit with an external input, and operating the control circuit to responsive to a signal at the external input to open the input power switch and operate the charge and discharge circuit to generate the voltage to the aircraft device from the supercapacitor bank.

In accordance with a further feature, a charge current regulated by the charge and discharge circuit is selectable, the method further comprises selecting the charge current.

In accordance with a further feature, the supercapacitor bank comprises a plurality of supercapacitors, the method further comprises monitoring a voltage of each one of the plurality of supercapacitors.

In accordance with a further feature, the plurality of supercapacitors are arranged in series.

In accordance with a further feature, the charge and discharge circuit to provide the emergency voltage level at a level that is above the preselected threshold voltage level.

Although the invention is illustrated and described herein as embodied in an emergency backup power circuit for an electrically operated aircraft window shade, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. To the extent that the inventive disclosure relies on or uses software or computer implemented embodiments, the terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/ dynamic load library and/or other sequence of instructions designed for execution on a computer system. Those skilled in the art can understand the specific meanings of the above-mentioned terms in the embodiments of the present invention according to the specific circumstances. The terms "voltage" and "voltage level" can be used interchangeably, and are meant to refer to a voltage magnitude at a given circuit location. Likewise with "current" and "current level," and "charge" and "charge level." This includes any specific descriptors placed before those terms, such as, for example, "output," "input," "threshold," and so on.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

Figure 1:
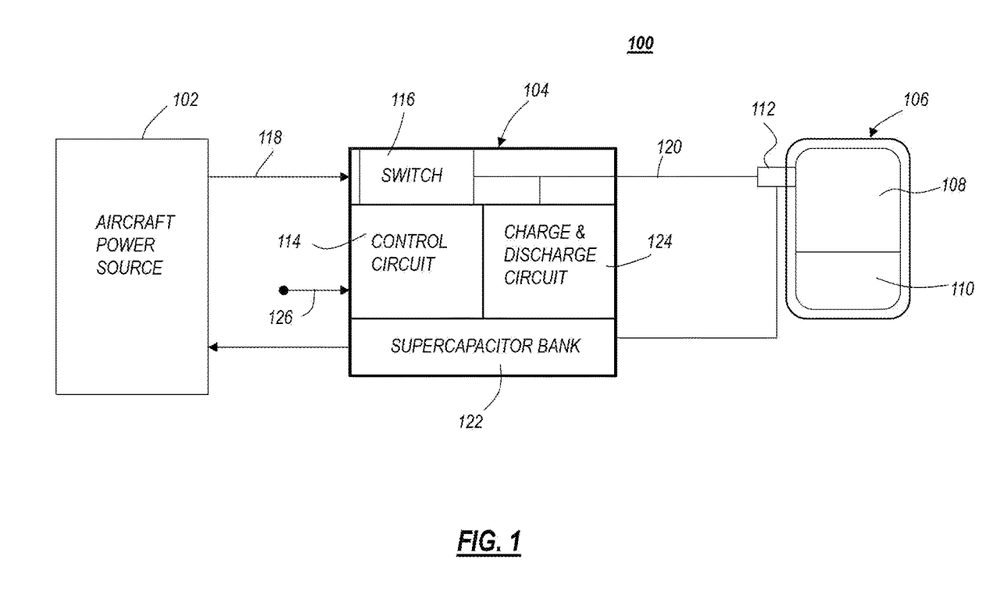
FIG. 1 is a system schematic diagram of an electrically operated aircraft window shade having an emergency power backup system, in accordance with some embodiments.

FIG. 1 is a system schematic diagram of an electrically operated aircraft window shade having an emergency power backup system 100, in accordance with some embodiments. In a typical aircraft there is a main power source 102 that generates electric power at twenty-eight volts for use by various aircraft systems, and aircraft devices, including window unit 106. The window unit 106 can be an electrically controlled aircraft window shade unit, which is a motorized window shade unit, and it can include, among other components, an electrically controlled shade 108 and a lens 110. The shade 108 can be raised or lowered to control the amount of light coming through the lens 110 from the outside. A motorized control unit 112 controls the position of the shade 108, and can include interface buttons that can be disposed, for example, adjacent or below the lens 110 on the interior of the aircraft that allow a user to raise or lower the shade 108 by pressing the appropriate button. The motorized control unit 112 can also be connected to an override that allows the aircraft flight crew to control the position of the shade 108 in a way that supersedes the user's control.

Electric power at the nominal twenty-eight volts is provided from the power source 102 to the motorized unit 112 through an emergency power backup system 104. Under normal operating conditions when the input voltage level on an input line 118 from the power source 102 is above a preselected threshold, the emergency backup power system 104 acts as a pass-through, and the same voltage is provided on a voltage feed line 120 as an output voltage level to the motorized unit 112 of the electrically controlled aircraft window shade. While the voltage from the power source 102 is above the preselected threshold, the emergency backup power system 104 charges a supercapacitor bank 122 to a predetermined voltage level using a charge and discharge circuit 124. Supercapacitors are known to have a superior cycle life to rechargeable batteries, if they are sufficiently protected from excess voltage and inrush or discharge current, and they can be lighter than rechargeable batteries, which makes them especially suitable for aircraft applications.

While operating, if the voltage level provided by the power source 102 falls below the preselected threshold, then the control circuit 114 can control a switch 116 to an open state that opens the electric path between the power source and the motorized unit 112, and operates the charge and discharge circuit to start generating a voltage on the voltage feed line 120 using charge stored in the supercapacitor bank 122. The amount of charge stored in the supercapacitor bank is sufficient to fully raise or lower the shade 108 at least once, and preferable several times to ensure there is sufficient charge. In practice, the voltage of the supercapacitor bank 122 can be substantially lower than that required on the voltage feed line to operate the motorized unit 112, and thus the charge and discharge circuit 124 can operate in a boost regulation mode to generate the necessary voltage level and electric power in general to operate the motorized unit 112. There is also a manual trigger input 126 that can cause the control circuit 114 to operate in the backup mode. The signal on the input line 126 can come from a flight crew panel, for example.

In determining when the voltage from the main power source 102 has fallen below the preselected threshold, there are several ways of performing that process. In order to avoid transient dips triggering the emergency backup power circuit, there can be some averaging of the voltage being sensed, for example. However, it is anticipated that the emergency backup power circuit should respond within about one millisecond in some applications. It will be appreciated by those skilled in the art that other electrically controlled aircraft devices can also be provided with backup emergency power in a similar manner.

Figure 2:
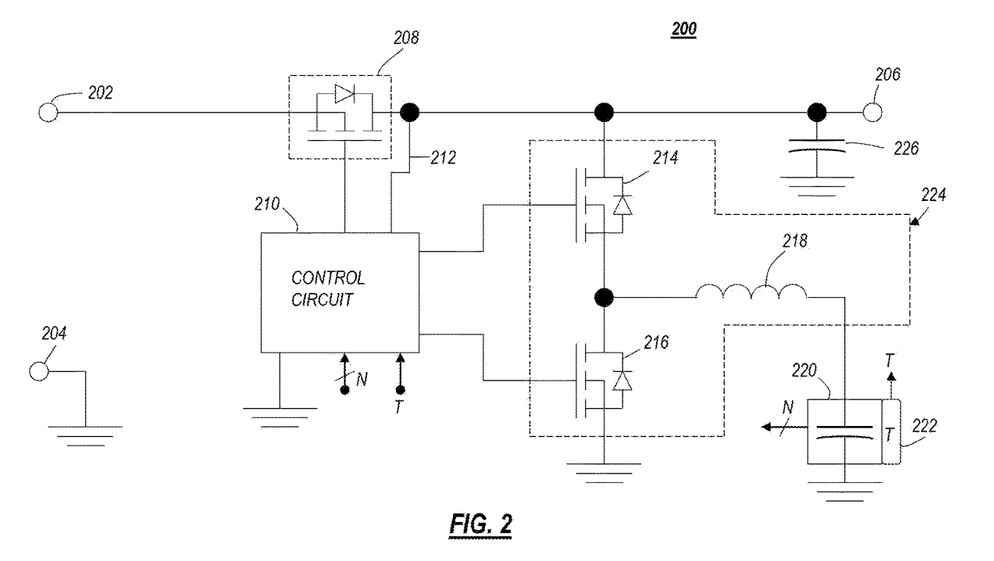
FIG. 2 is a detailed circuit abstraction of several main components of the emergency backup power circuit for an electrically operated aircraft window shade, in accordance with some embodiments.

FIG. 2 is a detailed circuit abstraction of several main components of the emergency backup power circuit 200 for an electrically operated aircraft window shade, in accordance with some embodiments. An input voltage level is provided by the aircraft power source (e.g. 102) between terminals 202, 204. Normally the voltage provided at terminal 202 will be evident at point 206, which is connected directly to the motorized unit of the electrically controlled window shade unit. A switch 208, however, is in series between nodes 202, 206. Under normal conditions the switch 208 is effectively closed. The switch 208 can be implemented by, for example, a MOSFET that is operated like a switch. That is, it is either in a very low impedance state ("closed") or in a very high impedance state ("open"), and the control circuit 210 controls the state of the switch 208 (e.g. by controlling the gate voltage).

During normal operation when the power source is providing the nominal voltage at terminals 202, 204, in addition to the switch 208 being closed, a charge and discharge circuit 224 is operated to provide charge into a supercapacitor bank 220. The charge and discharge circuit 224 includes a pair of series connected transistors 214, 216 that can be MOSFETs. An inductance 218 is then coupled between the supercapacitor bank 220 and the node where transistors 214, 216 are coupled together. To charge the supercapacitor bank 220, charge can be directed from the voltage feed line (e.g. 206) through transistor 214 and inductance 218. In this mode of operation, transistor 216 and transistor 214 are operated in a switched mode where they alternately and oppositely switch on/off relative to each other to control the current into the supercapacitor bank 220, where the inductance 218 will act to maintain a positive flow of current into the supercapacitor bank 220. Once the supercapacitor bank 220 reaches a maximum voltage level, which can be significantly lower than the nominal voltage provided by the main power source, then the current can be reduced to a maintenance level, or shut off, by controlling transistor 214. The supercapacitor bank 220 can include several supercapacitors, and the voltage across each one can be provided to the control circuit 210 on a series of signal lines "N." The temperature of the supercapacitor bank 220 can be sensed using a temperature sensing element that can be, for example, a negative temperature coefficient circuit 222 that provides a signal "T" to the control circuit 210. The voltage and temperature information can be used to optimize the charging and discharge of the supercapacitor bank 220 to maximize cycle life of the supercapacitor bank 220.

In the event of a loss of voltage from the main power source, the control circuit 210 will sense the loss of voltage and determine that it is below the preselected threshold. In response, the control circuit 210 will open switch 208, and operate transistor 214 to be in a high impedance mode. At the same time, transistors 214, 216 are again operated in a switched mode, switching between a low impedance state and a high impedance state alternately, to draw current through the inductance 218 from the supercapacitor bank 220 to line 206 where voltage ripple is filtered by a filter capacitor 226. This switched mode operation uses the "flywheel" effect of the magnetic field in the inductance 218 to generate a voltage that is higher than that of the supercapacitor bank 220. The control circuit 212 controls the switching of transistors 214, 216 based, in part, in the voltage sensed by line 212. There can also be current sensing of current through the inductance that is used to control the switching operation, as is well known in boost mode switching regulation control.

Figure 3:
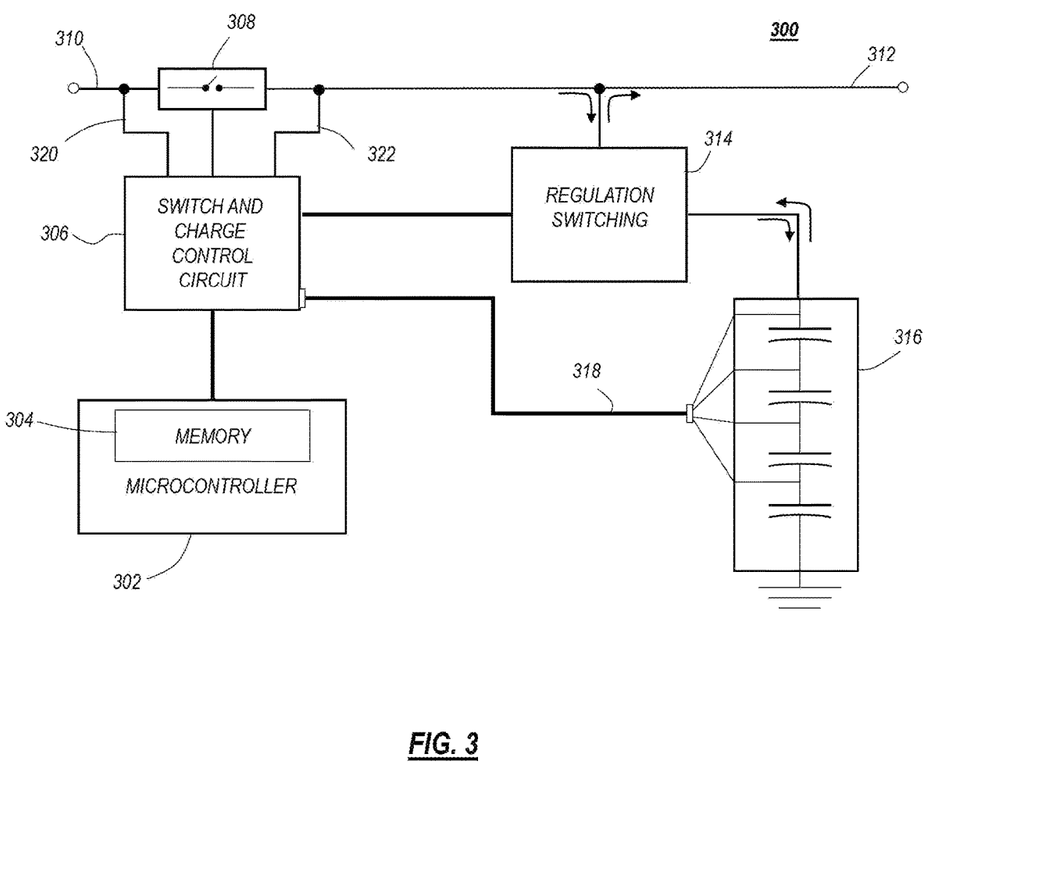
FIG. 3 shows a schematic block diagram of an emergency power backup circuit, in accordance with some embodiments.

FIG. 3 shows a schematic block diagram of an emergency power backup circuit 300, in accordance with some embodiments. The circuit 300 can be compatible with circuit 200, or it can be an alternative circuit, and shows more detail of different components. For example, there is a microcontroller 302 that is used to control operation of the other circuit sub-systems. The microcontroller includes a logic unit that performed instruction code that can be stored in a memory 304 and can be, for example, a unit sold by the trade designation PIC18F27Q10 by Microchip, Inc. The memory 304 as shown here can include both random access memory (RAM) as well as non-volatile storage memory such as flash memory for storing the main instruction code as well as programmable settings and other data. The non-volatile memory can be programmable to allow the instruction code and operating data to be updated or customized to particular applications.

The microcontroller 302 is operably coupled to a switch and charge control circuit 306, which can be implemented in an integrated circuit unit, such as that sold under the designation LTC3350 by Analog Devices, Inc., which is a high current supercapacitor backup controller and system monitor. The charge control circuit 306 controls a regulation circuit 314, which can be substantially similar to those components contained in block 224 of FIG. 2. The regulation circuit 314 controls the flow of charge into and out of the supercapacitor bank 316, as controlled by the charge control circuit 306. As shown here, the supercapacitors in the supercapacitor bank can arranged or coupled in series in order to increase the total voltage of the supercapacitor bank 316. The voltage across each supercapacitor in the supercapacitor bank 316 is sampled by the charge controller circuit 306 via lines 318.

As previously described, when the input voltage level at the input 310, as sensed by line 320 at the input side of the switch 308, is above a threshold level, which can be set depending on the application, the charge control circuit 306 maintains the input power switch 308 in a closed state. As a result, the voltage at the output 312 will be the same as at the input 310. During this standard operation the supercapacitor bank 316 is charged to a maximum level and maintained at that level. If the voltage at the input 310 drops below the established threshold, then the charge control circuit 306 opens the input power switch 308 and operates the switching regulation circuit 314 to provide a voltage on the output 312 from the supercapacitor bank 316. To minimize losses through the switching circuitry 314, the supercapacitor stack 316 can be a stack of series-connected supercapacitors. It is known that supercapacitors tend to have a low maximum voltage rating (e.g., about three volts). Thus, stacking the supercapacitors in series allows the supercapacitor stack 316 to provide a voltage level that is higher than any single supercapacitor can provide. The switching regulation circuit 314 is operable to convert the voltage provided by the supercapacitor stack to a level closer to, if not at the nominal operating level (e.g., 28 volts). This ensures that all circuitry of the window shade unit will work properly, and the backup power supply circuit 300 can be retrofit into existing systems. In other systems, the window shade circuitry can have a wider operating voltage range, and can be configured to operate at input voltage levels substantially below the nominal voltage level provided at the input 310, and the switching regulator 314 can allow the voltage on the output 312 to drop below the nominal voltage as voltage across the capacitor stack 316 decreases to reduce resistive losses through the switching circuit 314. To regulate the voltage at the output 312, the switch control circuit 306 can also monitor the voltage at the output side of the switch 308 by line 322.

Figure 4:
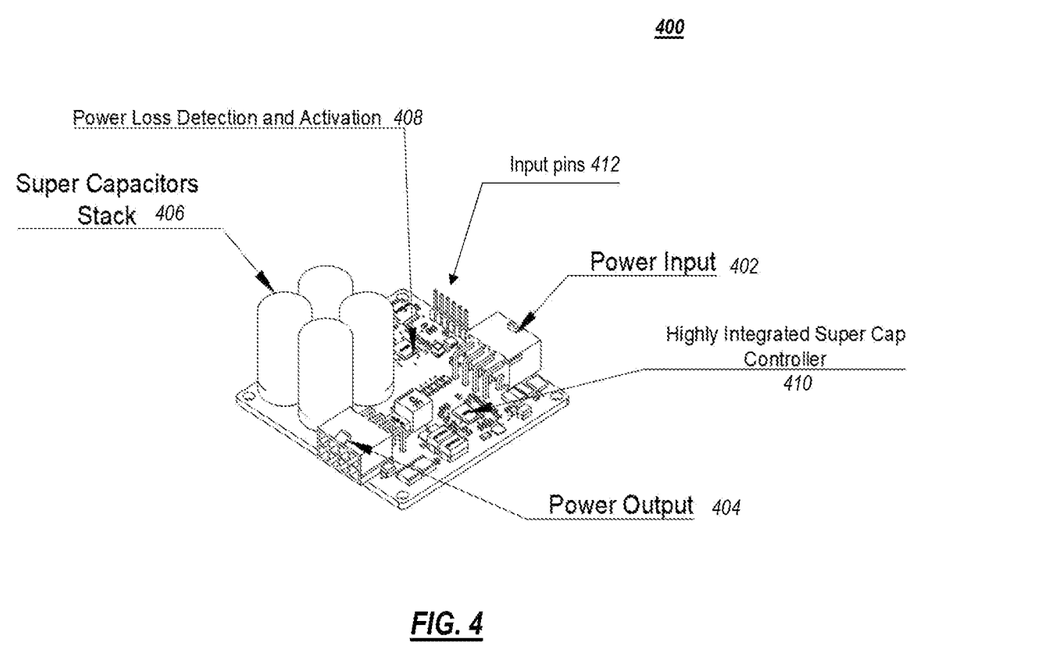
FIG. 4 is a perspective view of an emergency backup power circuit for an electrically operated aircraft window shade, in accordance with some embodiments.

FIG. 4 shows a perspective view of an emergency backup power circuit unit 400 for an electrically operated aircraft window shade, in accordance with some embodiments. The circuit unit 400 is provided on a circuit board that includes power input and power output connectors 402, 404, respectively, which correspond to input 310 and output 312 of FIG. 3. A power loss and detection circuit 408 is provided to detect a loss of power from the main aircraft power source, and a supercapacitor controller 410 is used to control power in and out of the supercapacitor stack 406 as described hereinabove. The circuit unit is configured for both retrofit and new build applications. That is, the circuit unit can be install into existing aircraft to provide emergency power backup to operate the window shade so that it can be opened or closed, as needed. A series input pins 412 can be used for external input, and/or testing inputs to operate the circuit unit 400. For example, the input pins can be connected to a main cabin control panel accessible by the flight crew to allow the flight crew to operate all window shade units to a desired state.

Figure 5:
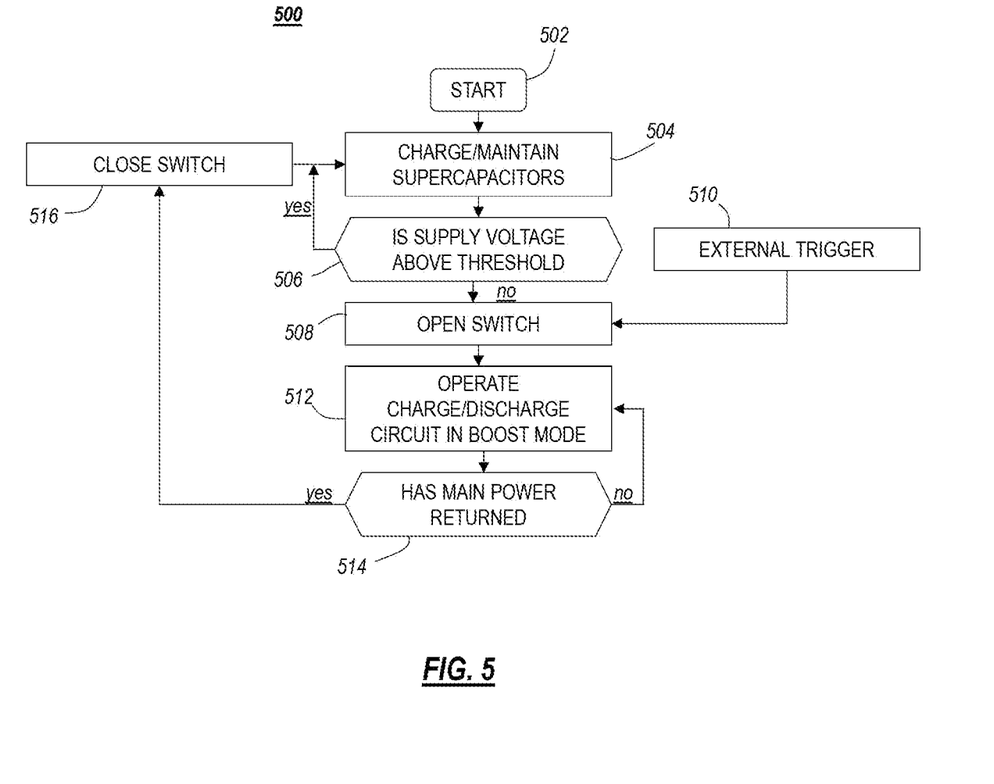
FIG. 5 is a flowchart diagram of a method of operating an emergency backup power circuit for an electrically operated aircraft window shade, in accordance with some embodiments.

FIG. 5 is a flowchart diagram of a method 500 of operating an emergency backup power circuit for an electrically operated aircraft window shade, in accordance with some embodiments. At the start 502 the aircraft systems are powered up and the main power source is providing the nominal voltage level (e.g. 28 V) to the electrically controlled window shade unit. The emergency backup power supply circuit is configured to ignore the startup process as the voltage comes up to the nominal voltage initially so as to not falsely trigger the backup operation. While the nominal voltage is being provided, the charge and discharge circuit is controlled by the control circuitry to charge the supercapacitor voltage level of the supercapacitor bank in step 504 to a supercapacitor nominal voltage level. The supercapacitor nominal voltage level can be about twenty percent of the nominal input voltage level normally provided at the input. While that process is occurring, in step 506 the circuitry is monitoring the input voltage from the main power source to detect a loss of voltage. As long as the supply voltage remains above the preselected threshold, then the method continues performing steps 504, 506. If the supply voltage is detected as falling below the preselected threshold, then in step 508 the switch (e.g. 208) is opened and the charge and discharge circuit is operated to start generating voltage from the supercapacitor bank at an emergency voltage level to the electrically controlled aircraft window shade unit in step 512. While the supercapacitor bank is being used to power the electrically controlled aircraft window shade unit, in step 514 the input voltage is monitored to determine if it has been restored in step 514. If the input voltage does return, then the method proceeds to step 516 where the switch is closed and steps 504, 506 are then resumed. In some cases, there can be an external trigger event 510 the causes the method 500 to advance from performing steps 504, 506 and proceed to step 508, 512. During steps 512, 514, the electrically controlled aircraft window shade can be raised or lowered, by either an aircraft passenger or by the flight crew.

An emergency backup power supply circuit for an electrically controlled aircraft window shade unit has been disclosed that stores charge in a supercapacitor bank. In event of a loss of power from the main power source, charge stored in the supercapacitor bank is used to generate sufficient voltage and current to power the window shade unit so that the window shade can be raised or lowered, as is desired, by the aircraft passenger or by the flight crew, or as an automatic response. By using a supercapacitor bank, the emergency backup power supply circuit does not need to draw power from the aircraft's emergency power generator, which allows all power generated by the emergency power generator to be directed to other functions instead of operating the window shades. Each emergency backup power supply circuit can be used to provide emergency power to one or more window shade units. The emergency electronic override (EEOR) system is for an aircraft application and stores charge in a supercapacitor bank from the aircraft main electrical power generator, while the power generator is working normally. The EEOR system also monitors the main power generator output, and in the event of a loss in power, the EEOR system changes from a storage mode to a generation mode to provide emergency power to an aircraft system or component. In some embodiments the EEOR system can configured to provide backup power to a single component, such as an electrically operated window shade unit, or it can be configured to provide power to several components or a system of components. The choice of application will dictate the size of the supercapacitor bank needed in order to provide the emergency backup power.

What is claimed is:

1. An emergency power backup system for an electrically controlled aircraft window shade unit, comprising:
   a supercapacitor bank having total capacitance for storing an amount of charge;
   a charge and discharge circuit coupled between the supercapacitor bank and a voltage feed line to the electrically controlled aircraft window shade unit;
   a switch coupled in series between a main power source and the voltage feed line; and
   a control circuit that is configured to:
      sense a voltage level from the main power source, and
      when the voltage level from the main power source is above a preselected threshold voltage and during transient dips of the voltage level from the main power source, maintain the switch in a closed state to allow current from the main power source to flow to the electrically controlled aircraft window shade unit and to further charge the supercapacitor bank to a preselected voltage level;
      when the voltage level from the main power source indicates a loss of power from the main power source that is not due to a transient, open the switch and operate the charge and discharge circuit to generate a voltage from the supercapacitor bank to the electrically controlled aircraft window shade unit, and wherein the electrically controlled aircraft window shade unit automatically raises or lowers a window shade of the electrically controlled window shade unit, wherein the total capacitance is selected so that the amount of charge stored in the supercapacitor bank allows the window shade to be fully raised or lowered at least once while the switch is open during the loss of power; and
   wherein current to charge the supercapacitor bank enters the charge and discharge circuit at the same connection where the charge and discharge circuit is connected to the voltage feed line through which current exits the charge and discharge circuit, and wherein the control circuit operates the charge and discharge circuit to charge the supercapacitor bank to a maximum voltage that is about twenty percent of a nominal voltage provided by the main power source to the electrically controlled aircraft device.

2. The emergency power backup system of claim 1, wherein the electrically control aircraft window shade unit is operable at a voltage level that is lower than a nominal voltage level provided by the main power source.

3. The emergency power backup system of claim 1, further comprising a temperature sensing element that provides a signal to the control circuit indicating a temperature of the supercapacitor bank, and wherein the control circuit is configured to adjust a charge current to the supercapacitor bank based on the temperature of the supercapacitor bank as indicated by the signal.

4. The emergency power backup system of claim 1, wherein the control circuit includes an external input to cause the control circuit to open the switch and operate the charge and discharge circuit to generate the voltage to the electrically controlled aircraft window shade unit from the supercapacitor bank.

5. The emergency power backup system of claim 1, wherein a charge current regulated by the charge and discharge circuit is selectable.

6. The emergency power backup system of claim 1, wherein the supercapacitor bank comprises a plurality of supercapacitors, the control circuit is configured to monitor a voltage of each one of the plurality of supercapacitors.

7. The emergency power backup system of claim 6, wherein the plurality of supercapacitors are arranged in series.

8. The emergency power backup system of claim 1, wherein the main power source provides a voltage at a nominal level, the voltage generated by the charge and discharge circuit is below the nominal level.

9. A method for providing a backup power source to an electrically controlled aircraft window shade unit, comprising:

providing, between a main power source and the electrically controlled aircraft window shade unit, an input power switch having an input side and an output side;

sensing an input voltage level on an input side of the input power switch, and sensing an output voltage level at an output side of the input power switch;

when the input voltage level as sensed at the input side of the input power switch is above a preselected threshold voltage level and during transient dips of the voltage level from the main power source, maintaining the input power switch in a closed state and operating a charge and discharge circuit to charge a supercapacitor bank that is operably connected to the output side of the input power switch from the output side of the input power switch, and maintain a supercapacitor voltage level at a supercapacitor nominal voltage level that is about twenty percent of a nominal voltage provided by the main power source to the electrically controlled aircraft window shade unit; and when the input voltage level as sensed at the input side of the input power switch indicates a loss of power from the main power source that is not due to a transient, opening the input power switch and maintaining the input power switch in an open state while a voltage at the input side of the input power switch is below a preselected threshold voltage level, and operating the charge and discharge circuit to provide an emergency voltage level at the output side of the input power switch from the supercapacitor bank to the electrically controlled aircraft window shade unit, and the electrically controlled aircraft window shade unit automatically raising or lowering a window shade of the electrically controlled window shade unit in response, wherein a capacitance of the supercapacitor bank is selected so that an amount of charge stored in the supercapacitor bank allows the window shade to be fully raised or lowered at least once during the loss of power.

10. The method of claim 9, wherein the electrically controlled aircraft window shade unit is a motorized window shade unit, the method further comprises, when the input voltage level as sensed at the input side of the input power switch falls below the preselected threshold voltage level, operating a motor of the motorized window shade unit using the emergency voltage level to open or close a window shade of the motorized window shade unit, and wherein the emergency voltage level is above the preselected threshold voltage level.

11. The method of claim 9, further comprising providing a temperature sensing element that provides a signal to a control circuit indicating a temperature of the supercapacitor bank; and adjusting a charge current to the supercapacitor bank based on the temperature of the supercapacitor bank as indicated by the signal.

12. The method of claim 11, further comprising:
providing the control circuit with an external input; and
operating the control circuit responsive to a signal at the external input to open the input power switch and operate the charge and discharge circuit to generate the voltage to the electrically controlled aircraft window shade unit from the supercapacitor bank.

13. The method of claim 9, wherein a charge current regulated by the charge and discharge circuit is selectable, the method further comprises selecting the charge current.

14. The method of claim 9, wherein the supercapacitor bank comprises a plurality of supercapacitors, the method further comprises monitoring a voltage of each one of the plurality of supercapacitors.

15. The method of claim 14, wherein the plurality of supercapacitors are arranged in series.

16. The method of claim 9, operating the charge and discharge circuit to provide the emergency voltage level at a level that is above the preselected threshold voltage level and below a nominal level of the main power source.

17. An aircraft system, comprising:
a plurality of motorized window shade units, each window shade unit of the plurality of window shade units including a window shade;
a plurality of emergency power backup circuits, each one of the plurality of emergency power backup circuits coupled between a respective one motorized window shade unit of the plurality of motorized window shade units and a main power source having a nominal voltage level;
each one of the plurality of emergency power backup circuits having:
a supercapacitor bank;
a charge and discharge circuit coupled between the supercapacitor bank and a voltage feed line to the respective one motorized window shade unit;
a switch coupled in series between the main power source and the voltage feed line; and
a control circuit that is configured to:
sense a voltage level from the main power source, and
when the voltage level from the main power source is above a preselected threshold voltage and during transient dips in the voltage level from the main power source, maintain the switch in a closed state to allow current from the main power source to flow to the respective one motorized window shade unit and to further charge the supercapacitor bank to a preselected voltage level with a charge amount that allows the window shade to be fully raised or lowered at least once during a loss of power from the main power source;
when there is a loss of power from the main power source that is not due to a transient, open the switch and operate the charge and discharge circuit to generate a voltage to the respective one motorized window shade unit, and wherein the respective one motorized window shade unit automatically raises or lowers its window shade in response; and wherein current to charge the supercapacitor bank enters the charge and discharge circuit at the same connection where the charge and discharge circuit is connected to the voltage feed line through which current exits the charge and discharge circuit, and wherein the control circuit operates the charge and discharge circuit to charge the supercapacitor bank to a maximum voltage that is about twenty percent of a nominal voltage provided by the main power source to the electrically controlled aircraft device.

* * * * *